United States Patent [19]

Yoshida

[11] Patent Number: 5,285,188
[45] Date of Patent: Feb. 8, 1994

[54] VEHICLE COLLISION DETECTING SYSTEM

[75] Inventor: Ryouichi Yoshida, Shiga, Japan

[73] Assignee: Takata Corporation, Tokyo, Japan

[21] Appl. No.: 890,119

[22] Filed: May 29, 1992

[30] Foreign Application Priority Data

Jun. 7, 1991 [JP] Japan .................................. 3-136567

[51] Int. Cl.⁵ .............................................. B60Q 1/00
[52] U.S. Cl. ..................................... 340/436; 280/735
[58] Field of Search ................... 340/436, 438, 670; 280/735; 180/282

[56] References Cited

U.S. PATENT DOCUMENTS 3,687,213  8/1972  Sato et al. .......................... 280/735
3,703,702  11/1972  Arai .................................. 280/735

FOREIGN PATENT DOCUMENTS 2256146  11/1972  Fed. Rep. of Germany ...... 280/735
2-218988  8/1990  Japan .

Primary Examiner—Hezron E. Williams
Assistant Examiner—Christine K. Oda
Attorney, Agent, or Firm—Kanesaka and Takeuchi

[57] ABSTRACT

A vehicle collision detecting system includes an impact sensor, a distance sensor for detecting a distance to an obstacle, a differential circuit for differentiating the distance to provide a relative speed, and a microcomputer for computing a distance after a time, based on the detected distance and the relative speed, and determining whether the computed distance becomes zero within a predetermined time. If the calculated distance becomes zero within the predetermined time, a collision unavoidable signal is generated. A collision signal or air bag activating signal is then generated as soon as an impact is detected by the impact detector.

5 Claims, 3 Drawing Sheets

VEHICLE COLLISION DETECTING SYSTEM

BACKGROUND OF THE INVENTION

1. Field of the Invention

The present invention relates to a vehicle collision detecting system used for activating, for example, an air bag system of vehicles.

2. Description of the Related Art

An air bag system protects passengers in a vehicle by inflating air bags when the vehicle has collided.

FIG. 4 shows a prior art vehicle collision detecting system for such air bag system. In the figure, front impact detecting sensors 1 and 2 are provided at the front portion of a vehicle and impact detecting safety sensors 3 and 4 are provided within a diagnostic unit 5. FIG. 5 is a connection diagram of those sensors 1 through 4, and the sensors 1 and 2 and the sensors 3 and 4 are arranged in parallel respectively and these sensors 1 and 2 and the sensors 3 and 4 are arranged in series to an inflator 6.

The front sensors 1 and 2 are switched ON when an acceleration of, for example, more than 10 to 15 G (G: gravitational acceleration) is detected and the safety sensor 3 and 4 are switched ON when an acceleration of 2 to 3 G is detected. The safety sensors 3 and 4 are provided to determine whether an impact is a collision and to expand an air bag 7 only when both the sensor 1 or 2 and the sensor 3 or 4 are switched ON, because the sensors 1 and 2 may be switched ON even by such a degree of impact as hit by a hammer.

Japanese Patent Laid-open NO. Hei 2-218988 describes a method for predicting a collision by dividing a distance from a foregoing vehicle by a difference of relative speeds with the foregoing vehicle.

In the aforementioned prior art air bag system, however, the inflator 6 is not ignited and activated during the time period between when the sensor 1 or 2 is switched ON and when the sensor 3 or 4 is switched ON, so that the expansion of the air bag is delayed to that extent. Although an air bag for the driver's seat may be expanded so that a driver is fully protected using a small capacity inflator even if the activation of the inflator is delayed more or less since the volume of the air bag is small, the air bag for the assistant driver's seat requires an inflator having a large capacity, since the volume of the air bag is large, to rapidly inflate the large air bag to securely protect the passenger. Accordingly, it has become a factor for increasing the cost of the system.

By the way, in order to rapidly expand the air bag, the air bag has to be strong so that it can sustain an impact applied thereto when the expansion is completed. Accordingly, it has become another factor for increasing the cost.

The aforementioned method for predicting a collision by dividing a distance from a foregoing vehicle by a difference of relative speeds cannot be utilized for the vehicle collision detecting system for the air bag system as it is since its prediction reliability is too low.

SUMMARY OF THE INVENTION

Accordingly, it is an object of the present invention to solve the aforementioned problems by providing a vehicle collision detecting system that can predict a collision of a vehicle before an actual collision occurs and can immediately start expanding air bags when the vehicle has actually collided, thereby allowing to reduce the capacity of inflators of the air bag system, to reduce the required strength of the air bags and to bring the cost of the air bag system considerably down.

It is another object of the present invention to provide a vehicle collision detecting system that can securely protect passengers of the vehicle by fully expanding the air large bags before a large acceleration is applied to the passengers.

It is still another object of the present invention to provide a vehicle collision detecting system that will not expand the air bags when a mere impact is applied to the vehicle, i.e. the air bag activating system will not be activated at unnecessary times.

It is a further object of the present invention to provide a vehicle collision detecting system that has a very high reliability in detecting a collision.

In order to attain the foregoing goals, according to the present invention, the vehicle collision detecting system is comprised of an impact detecting sensor disposed at the front portion of the vehicle and a vehicle collision predicting unit for predicting a collision from a rate of change of distance to an obstacle ahead of the vehicle and outputs a collision signal when the impact detecting sensor detects an impact after the vehicle collision predicting unit has predicted a collision.

In the vehicle collision detecting system of the present invention, the vehicle collision detecting unit is comprised of a detecting means for detecting a distance to an obstacle ahead, means for finding the rate of change of the distance by differentiating the distance by a time and computing means for computing distance D after time t as function of time t, i.e. D(t), based on the distance and the rate of change of the distance to output a collision unavoidable signal when D(t) is going to become zero within a predetermined time T.

The vehicle collision detecting system of the present invention identifies an impact with a collision when the impact detecting sensor actually detects the impact after the vehicle collision predicting unit has predicted the collision. Accordingly, if the impact detecting sensor provided at the front portion of the vehicle is set to be able to detect even a small acceleration such as 2 to 3 G, a collision signal may be outputted immediately when the impact detecting sensor detects such a small impact. Since the system does not identify an impact with a collision if the vehicle collision predicting unit does not predict a collision even if the impact detecting sensor has detected no impact, the collision signal will be outputted even if an impact, other than a collision, such as made by a hammer is applied.

Thus, according to the present invention, a collision may be detected instantly and accurately. Therefore, the passenger may be fully protected even if an air bag is slowly expanded by an inflator having a small capacity when the vehicle collision detecting system is adopted to the air bag control mechanism.

The vehicle collision predicting unit used in the present invention determines whether distance between cars D will become zero within time T based on the distance to the obstacle or car ahead and on the rate of change of the distance and outputs a collision unavoidable signal when the distance D is going to be zero, so that the detecting system has a high reliability.

The above and other advantages of the invention will become more apparent in the following description and the accompanying drawings:

FIG. 1 is a side view of a vehicle which is provided with a vehicle collision detecting system according to a preferred embodiment of the present invention;

FIG. is a circuit block diagram of the vehicle collision detecting system;

DETAILED DESCRIPTION OF PREFERRED EMBODIMENT

Figure 1:
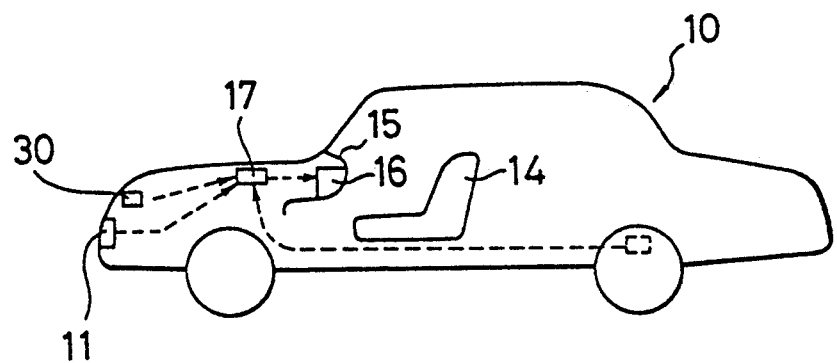

Referring now to the drawings, a preferred embodiment of the present invention will be explained.

Figure 2:
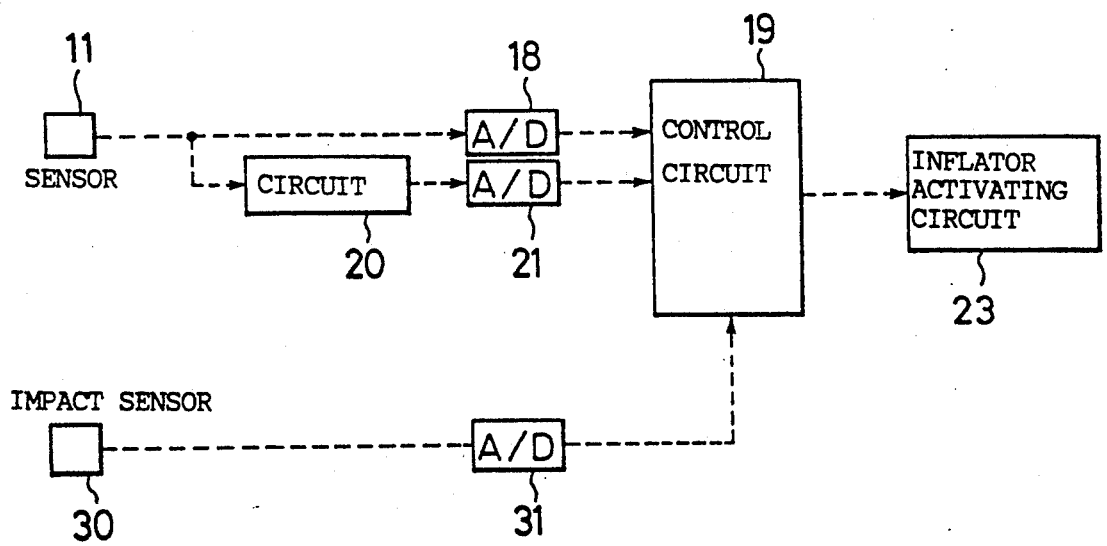
Figure 3:
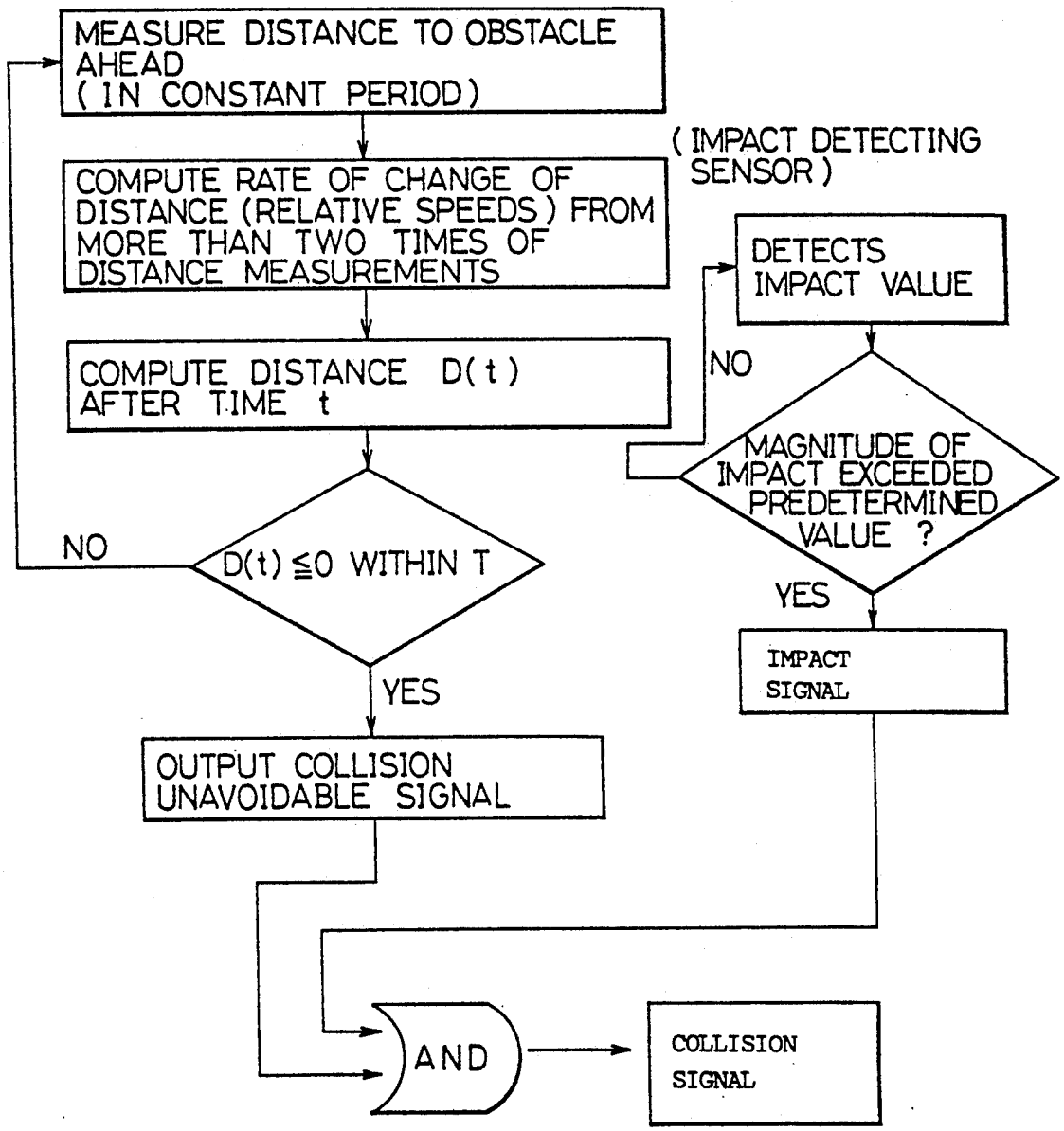
FIG. 3 is a flow chart explaining a vehicle collision predicting program.
Figure 4:
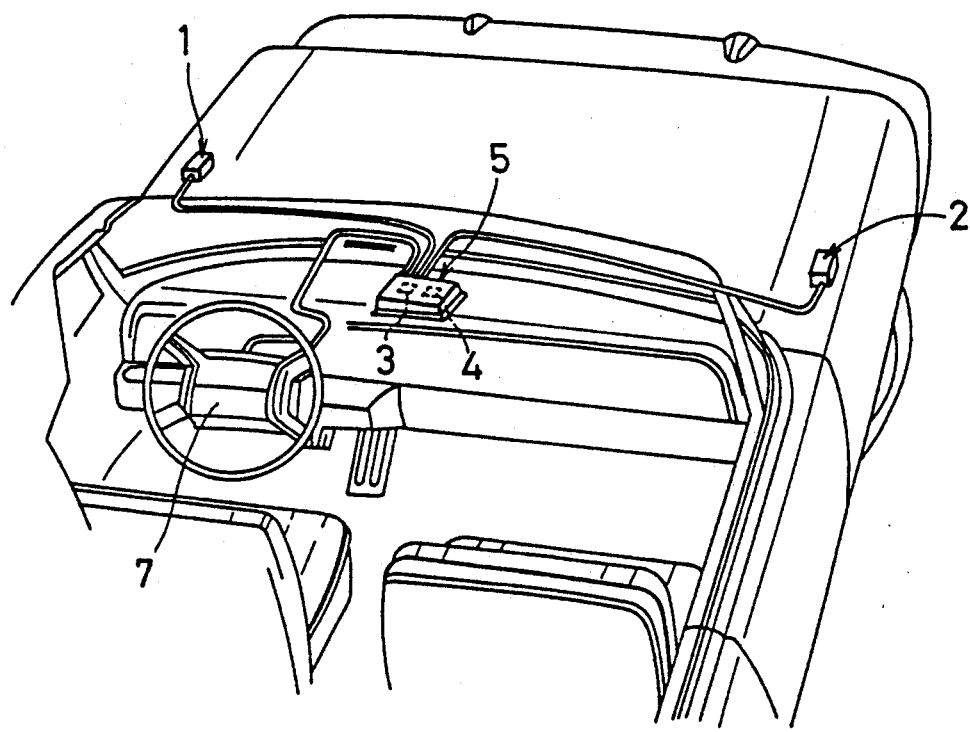
FIG. 4 is a perspective view illustrating a prior art air bag system.
Figure 5:
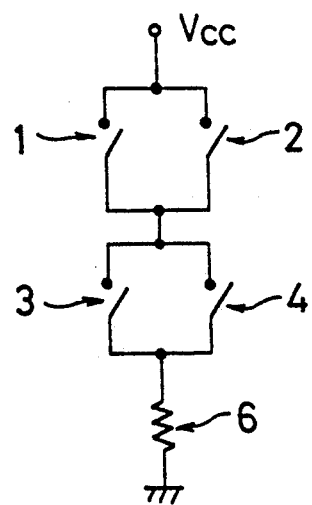
FIG. 5 is a circuit diagram explaining the prior art air bag system.

FIG. 1 is a schematic side view of a vehicle which is provided with a vehicle collision detecting system of a preferred embodiment of the present invention, FIG. 2 is a block diagram explaining a circuit structure of the vehicle collision detecting system and FIG. 3 is a flow chart explaining a program incorporated in a microcomputer of the vehicle collision detecting system.

In FIG. 1, a sensor 11 for detecting a distance between cars and an impact sensor 30 are provided at the front portion of a vehicle 10. This impact sensor 30 detects acceleration of more than 2 to 3 G. An air bag system 16 for the assistant driver's seat 14 is installed in an instrument panel 15 in front of the assistant driver's seat 14 of the vehicle 10. The reference numeral 17 denotes a main body of the vehicle collision predicting unit.

As shown in FIG. 2, detection signals of the sensor 11 and the impact sensor 30 are inputted to a control circuit 19 through the intermediary of A/D circuits (analog to digital conversion circuit) 18 and 31. The detection signal of the sensor 11 is also inputted to the control circuit 19 through the intermediary of a differential circuit 20 and an A/D circuit 21. The control circuit 19 includes a microcomputer and an AND gate for receiving a collision unavoidable signal form the microcomputer and an impact signal from the impact detector 30 and outputting a collision signal which causes an inflator activating circuit 23 to output an inflator activating signal.

As shown in FIG. 3, a collision of the vehicle is predicted and an actual impact is detected to detect an actual collision. That is, a distance to an obstacle ahead and a rate of change of the distance, i.e. a relative speeds with the obstacle ahead, are read from the signals outputted from the A/D circuits 18 and 21. Then, taking the maximum deceleration (determined by brake performance of the vehicle) of the vehicle into account, a distance D(t) after a time t (unit: second, for example) is computed to determine whether the D(t) will be zero within a predetermined time T. If the D(t) will not become zero within this time T, the program returns to the first step. It D(t) is going to become zero within the time T, a collision unavoidable signal is outputted. Then, when an actual impact is detected by the impact sensor 30, the inflator activating circuit 23 is immediately activated. Thus the inflator may be immediately activated and the air bag is started to be inflated when the vehicle 10 has actually collided. Accordingly, the capacity of the inflator of the air bag system 16 may be small and the inflating speed of the air bag may be low. Furthermore, the air bag is already fully expanded when the large acceleration is about to be applied to the passenger, so that the passenger may be surely protected.

In the present invention, the time T is set by dividing is what the distance between the cars by a difference of relative speeds for example.

Although the aforementioned embodiment has been incorporated in the air bag system for expanding the air bag for the assistant driver's seat, it is apparent that the present invention may be used for a collision predicting system of the air bag system for the driver's seat.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A vehicle collision detecting system, comprising:
   an impact detecting sensor provided at the front portion of a vehicle, said impact detecting sensor outputting a signal immediately after detecting an initial impact caused by collision of the vehicle; and
   a vehicle collision predicting unit for predicting a collision from a rate of change of a distance to an obstacle from said vehicle, said vehicle collision predicting unit comprising:
   detecting means for detecting said distance to the obstacle;
   differentiating means connected to said detecting means for finding said rate of change of said distance by differentiating said distance by time;
   computing means connected to said detecting means and said differentiating means for computing a distance D(t) after a time t as a function of time based on said distance and said rate of change, said computing means outputting a collision unavoidable signal when said distance D(t) is zero within a predetermined time T; and
   an AND gate connected to said vehicle collision predicting unit and said impact detecting sensor, said AND gate outputting a collision signal to an air bag system only when and immediately after said impact detecting sensor detects the initial impact after said vehicle collision predicting unit outputs a collision unavoidable signal to said AND gate.

2. The vehicle collision detecting system according to claim 1, wherein said time T is determined by dividing said distance by said rate of change of said distance.

3. The vehicle collision detecting system according to claim 1, wherein said differentiating means for finding said rate of change is a differential circuit.

4. The vehicle collision detecting system according to claim 1, wherein said impact detecting sensor is set to detect an acceleration of at least 2 G.

5. A vehicle collision detecting system, comprising:
   an impact sensor provided at a first front portion of a vehicle for generating an impact signal immediately after detecting an initial impact caused by collision of the vehicle;
   a distance detector provided at a second front portion of said vehicle for detecting a distance between said vehicle and an obstacle in front of said vehicle;
   a differential circuit connected to said distance detector for providing a rate of change of said distance;
   a control circuit including a microcomputer connected to said distance detector and said differential circuit for forming a function of time D(t) based on said distance and said rate of change and generating a collision unavoidable signal only if said function has a value of zero within a predetermined time T, and an AND gate connected to said microcomputer and said impact sensor for generating a collision signal only when and immediately after said impact detecting sensor detects the initial impact after said control circuit outputs said collision unavoidable signal to said AND gate; and an inflator activating circuit connected to said AND gate for activating an inflator upon reception of said collision signal.

* * * * *